Aug. 1, 1950 C. PAGE 2,517,341
ADJUSTABLE RANGE EGG-SORTING MACHINE
Filed Aug. 29, 1947 3 Sheets-Sheet 1
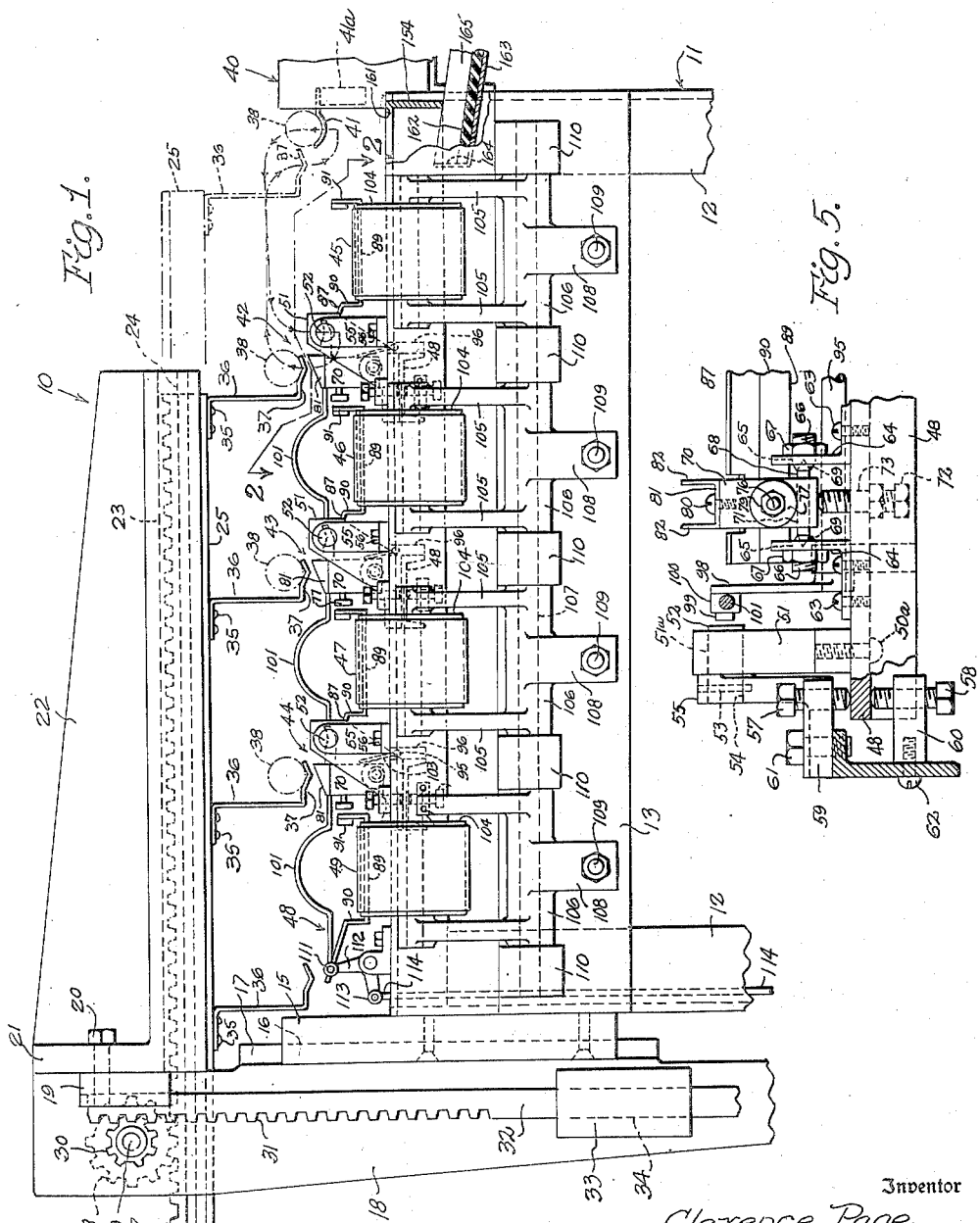
Inventor
Clarence Page
By Barthel + Bugbee
Attorneys

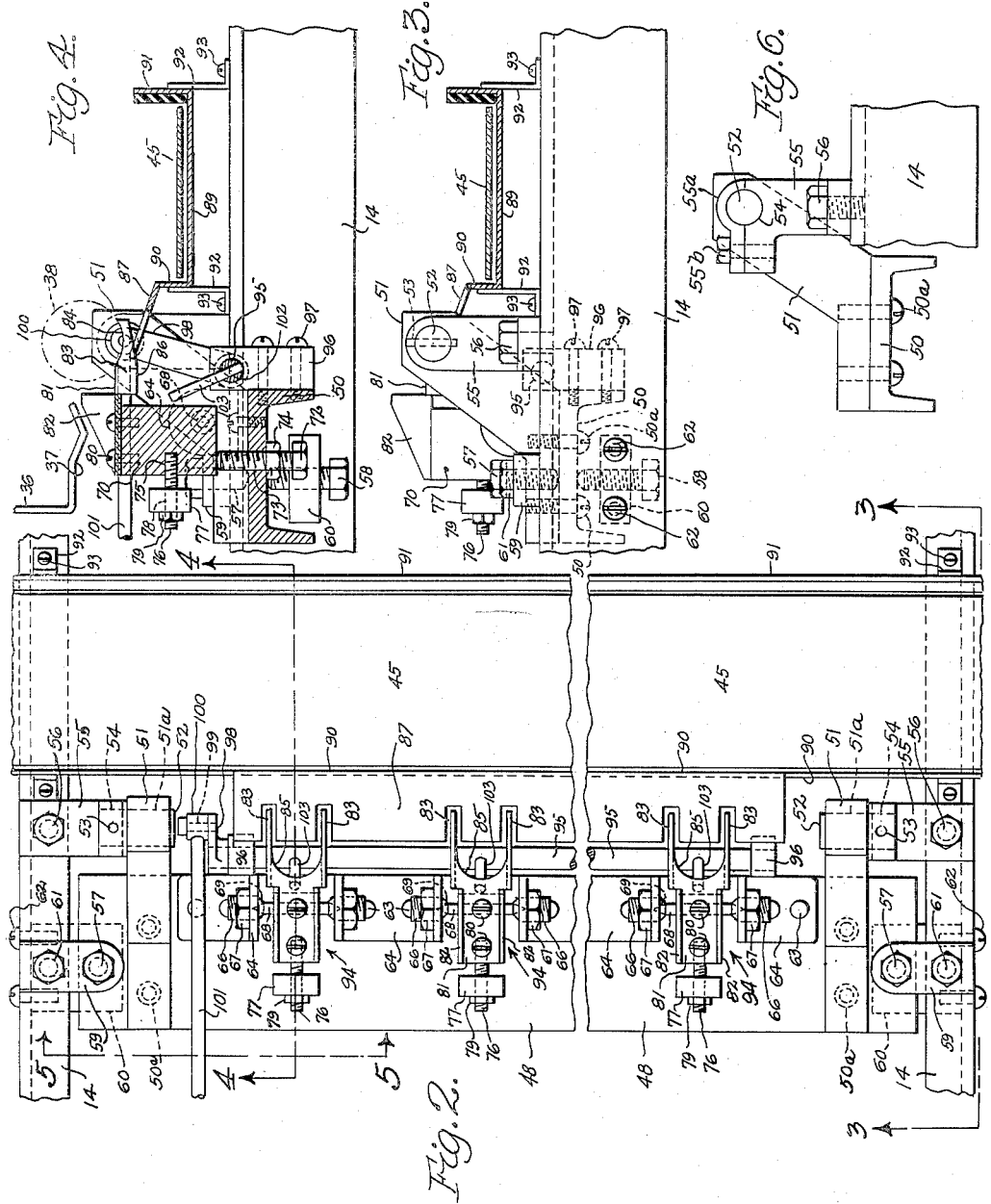

Aug. 1, 1950
C. PAGE
2,517,341
ADJUSTABLE RANGE EGG-SORTING MACHINE
Filed Aug. 29, 1947
3 Sheets-Sheet 3
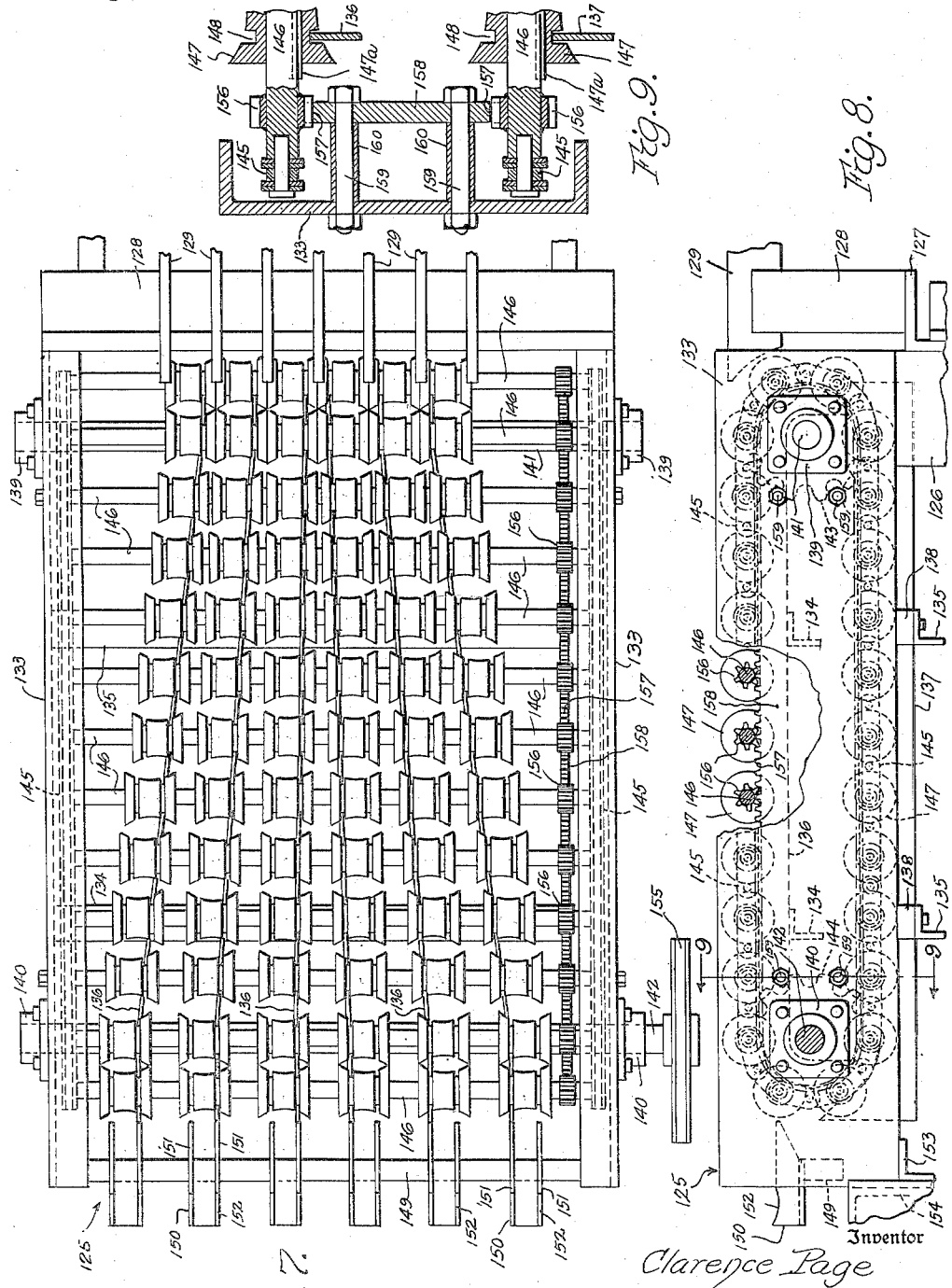
Inventor
Clarence Page
Barthel & Bugbee
Attorneys Patented Aug. 1, 1950

2,517,341

UNITED STATES PATENT OFFICE 2,517,341

ADJUSTABLE RANGE EGG-SORTING MACHINE

Clarence Page, Detroit, Mich., assignor to Page and Cox, Detroit, Mich., a corporation of Michigan Application August 29, 1947, Serial No. 771,227

13 Claims. (Cl. 209—121)

This invention relates to machines for grading articles according to their weight, and in particular to egg-grading machines.

One object of this invention is to provide an egg-grading machine which will grade eggs according to their weight at a series of weighing stations, the machine being provided with conveying mechanism which conveys the eggs from one station to another, each station being adapted to weigh and grade out the given range of weights of eggs.

Another object is to provide an egg-grading machine, as set forth in the preceding objects, wherein an adjustment is provided for simultaneously altering the weight limits of eggs graded at any particular weighing station, so that if, for example, the eggs being graded would result in disproportionate amounts being allocated to different ranges, these disproportionate amounts can be corrected so as to apportion the eggs in ranges which are more nearly according to the proportions which the operator desires.

Another object is to provide an egg-grading machine, as set forth in the preceding objects, wherein the egg-weighing machines are arranged side by side at each weighing station, and conveyors are provided for each station for carrying away the eggs graded out at each station, the previously-mentioned range adjusting mechanism permitting the proportion of eggs carried by each conveyor to be varied as desired.

Another object is to provide an egg-grading machine, as set forth in the preceding objects, wherein each bank or row of egg-weighing devices is removable as a unit for cleaning purposes.

Another object is to provide an egg-grading machine, as set forth in the preceding objects, wherein an egg-feeding unit is provided which forcibly rotates the eggs while conveying them automatically to the egg-weighing unit, turning the eggs until their long axes are horizontal while separating them laterally into spaced rows of eggs.

This application is a continuation, in part, of my copending application, Serial No. 718,755, filed December 27, 1946, for Egg-Grading Machine, now matured into Patent #2,481,440, dated September 6, 1949.

In the drawings:

Figure 1 is a fragmentary side elevation of a portion of an egg-grading machine, according to a preferred form of the invention, showing the egg-weighing units or stations and the weight-range adjustment associated therewith;

Figure 2 is a top plan view of one of the egg-weighing units or stations of the egg-grading machine shown in Figure 1, looking along the line 2—2 in Figure 1;

Figure 3 is an enlarged fragmentary side elevation of the egg-weighing unit or station shown in Figure 2, partly in section along the line 3—3 in Figure 2;

Figure 4 is a central vertical section through one of the egg-weighing devices in the egg-weighing unit shown in Figure 2, taken along the line 4—4 therein;

Figure 5 is a rear elevation, partly in longitudinal section, along the line 5—5 in Figure 2, of one end of an egg-weighing unit with one of the egg-weighing devices;

Figure 6 is a fragmentary side elevation of a portion of the mechanism shown in Figure 3 as modified to permit quick removal of an entire bank of weighing devices;

Figure 7 is a top plan view of an egg-feeding unit for use with the egg-weighing units shown in Figure 1;

Figure 8 is a side elevation, partly broken away, of the egg-feeding unit shown in Figure 7; and Figure 9 is a fragmentary vertical section along the line 9—9 in Figure 8.

In my co-pending application Serial No. 718,755, filed December 27, 1946, for an Egg-Grading Machine, I have disclosed a machine which grades eggs according to their weight at a series of egg-grading stations or units, the eggs being automatically transferred from one station to another in the event that they are not graded out at a particular station. The machine shown in my above-mentioned co-pending application provides an individual adjustment for altering the weight setting of each of the individual egg-weighing devices in a given egg-weighing unit or station, but does not provide a simultaneous adjustment for simultaneously altering the weight-settings of all the egg-weighing devices at a given station or unit.

In the handling of large quantities of eggs, it has been found that the average weights of the egg vary according to the season of the year. Accordingly, if the egg-weighing devices in the various stations give a suitable proportionate distribution of the eggs at one season of the year, it is found that the proportionate distribution will vary considerably at other seasons of the year. The present invention therefore provides mechanism for simultaneously adjusting the weight-settings of all of the egg-weighing devices in a given weighing station, so that the critical weight at which an egg is graded out may be altered for all of the egg-weighing devices in a given station or unit without having to adjust all of the egg-weighing devices individually. Thus, if at a given season of the year the average weights of the eggs are running heavy, the egg-weighing devices may be simultaneously adjusted to pass heavier eggs to the subsequent weighing stations without grading them out. This prevents the eggs from being disproportionately graded out at any given weighing station and imparts a flexibility to the weighing machine which adapts it to varying conditions otherwise beyond the control of the user.

Referring to the drawings in detail, Figure 1 shows the upper portion of an egg-grading or sorting machine, generally designated 10, this being the portion of the machine pertinent to the present invention. The machine as a whole is described and claimed in my co-pending application Serial No. 718,755, filed December 27, 1946, for an Egg-Grading Machine, as stated above. The portion of the machine pertinent to the present invention consists of a frame 11 having uprights 12 interconnected by lower cross members 13 and upper cross members 14. The cross members 13 and 14 are preferably of channel cross-section in order to provide sufficient rigidity.

Bolted to the rearward side of the frame 11, which is approximately rectangular in plan view, is a guide block 15 having a guide groove 16 in the form of a dove-tail groove which slidably receives a dove-tail slide 17 to which is attached a vertically-reciprocable member 18. The upper end of the vertically-reciprocable member 18 is flanged, as at 19. Bolted, as at 20, to the flange 19, is a corresponding vertical flange 21 upon a horizontal member 22 which extends forwardly over the machine 10.

The horizontal member 22 is of roughly T-shaped cross-section, and is provided with a horizontal cavity 23 along the opposite sides of which are mounted parallel guide ribs 24 of V-shaped cross-section (one only being shown) upon which a horizontally-movable slide or carriage 25 is reciprocably mounted, the slide 25 having guide grooves 26 of V-shaped cross-section corresponding to the guide grooves 24 and slidably engaging the latter. The slide 25 is provided with rack teeth 27 on its upper side and these mesh with a pinion 28 mounted upon a shaft 29 journaled in the vertically reciprocable member 18.

Mounted on the outer end of the shaft 29 is a pinion 30 which, in turn, meshes with rack teeth 31 upon a vertically reciprocable rack bar 32, the lower portion of which is guided by a boss 33 having a bore 34 of square cross-section corresponding to the square cross-section of the rack bar 32.

Secured, as at 35, to the under side of the slide 25, are approximately Z-shaped egg-holders 36, with bent fingers 37 at their lower ends adapted to hold the eggs 38 to be graded. The eggs 38 are separated from their containers by an egg-feeding unit of the machine, generally designated 40 (Figure 1) which is disclosed and claimed in my previously-mentioned co-pending application Serial No. 718,755, filed December 27, 1946. The unit 40 separates the eggs from their containers and deposits them in a row upon egg-rests 41 consisting of pairs of spaced curved pins, where they are picked up by the fingers 37 of the egg-holders 36 and transported from one weighing station to another as hereinafter explained. The curved pins or egg-rests 41 are, in turn, mounted in spaced pairs along the bar 41a.

In order to transport the eggs 38 from the egg rests 41 to the various weighing stations, the vertical member 18 and the rack shaft 32 are reciprocated vertically by cams, as disclosed in my co-pending application Serial No. 718,755, mentioned above, the reciprocation of the rack shaft 32 causing rotation of the pinions 30 and 28 and the reciprocation of the horizontally movable slide or carriage 25, as shown in the dotted lines in Figure 1. The slide 25 is also carried up and down bodily by the vertically-reciprocable member 18 in timed relationship therewith so that the fingers 37 describe the path shown by the arrows and chain lines at the right-hand side of Figure 1. The slide 25 first is raised as it is advanced to the right along the upper dotted line until it reaches the position shown by the dotted line in the upper right-hand corner of Figure 1. The slide 25 then drops downward and is thereafter moved to the right and then upward, the forked fingers 37 passing on opposite sides of the egg rests 41, which are likewise slotted to receive and pass the fingers 37, lifting the eggs 38 off the rests 41 and carrying them to the left in the direction of the arrows, then downward to deposit them at the first egg-weighing station and finally upward and forward again to repeat the cycle. All this mechanism and the motions produced by it have been fully described and illustrated in my above-mentioned co-pending application Serial No. 718,755, and are beyond the scope of the present invention.

The frame 11 is roughly in the form of a table which supports several egg-weighing or grading stations, generally designated 42, 43 and 44, each of which is equipped with an endless conveyor 45, 46 and 47 respectively (Figure 1). The egg-weighing or grading units or stations 42, 43 and 44 are identical in construction and differ only in their setting. At the station 42, the heaviest range of eggs is weighed out and deposited upon the conveyor 45, at the next station 43 the range of eggs of medium weight is similarly graded out and carried away by the conveyor 46, and at the station 44 the lightest range of eggs is similarly graded out and carried away by the conveyor 47. Any remaining eggs are then carried to a non-weighing station 48 where they are dumped upon a conveyor 49 which carries them away. Since the weighing units or stations 42, 43 and 44 are similar, a description of the station 42 will suffice for all.

Mounted between the upper cross-members 14 of the frame 11 are channel members 50 (Figures 2 and 4), the opposite ends of which have upwardly-bent pivot arms 51 bolted thereto, as at 50a. The upper ends of the arms 51 are bored, as at 51a (Figure 2), to receive pivot pins 52, these, in turn, being secured as by the pins 53 in bores 54 in the upwardly-extending portions of angle brackets 55, the horizontal portions of which are bolted as at 56 to the upper frame cross-members 14. The channel members 50 are thus mounted to swing upward or downward and locked in place by oppositely-extending cap screws 57 and 58 threaded vertically toward one another through brackets 59 and 60 which, in turn, are secured, as at 61 and 62, respectively (Figures 2 and 5), to the upper horizontal frame members 14.

Mounted, as by the fasteners 63, on the upper surface or web of each channel member 50, is a series of pairs of oppositely-facing angle brackets 64, the inner angle brackets being doubled or U-shaped for convenience. The upright portions of these angle brackets are provided with threaded bores 65 (Figure 5) to receive pivot screws 66 locked in position by lock nuts 67 and having pointed pivot rods or spindles 68 mounted in conical sockets 69 in the inner ends of the pivot screws 66. Mounted on the spindles 68 are blocks 70 having bores 71 (Figure 5) for the reception of the spindles 68. The pivotal motion of the blocks 70 is limited by limit screws 72 (Figure 4) threaded through the bores 73 in the webs of the channel members 50 and locked in position by the lock nuts 74. The upper ends of the limit screws 72 engage the lower surfaces of the blocks 70, forming a rest for these blocks.

Threaded into the horizontal bores 75 in the backs of the blocks 70 are studs 76. Mounted on the studs 76 (Figure 4) are counterweights 77 which have threaded bores 78 and are held in position by lock nuts 79. Secured, as by the fasteners 80, to the upper surfaces of the blocks 70, are egg supports 81, the rearward portions of which are provided with upwardly-extending wings 82. The forward portions 83 (Figure 2) of the egg supports 81 consist of spaced arms which are arcuately cut away on their upper edges, as at 84 (Figure 4). The portions 84 are suitably curved according to the curvature of an average egg, and are separated from one another by cutaway portions 85 (Figure 2), and also have downwardly-depending flanges 86 along their lower lateral edges. Immediately beneath the forward portions 83 (Figures 2 and 4) are inclined ramps or aprons 87 having slots 88 for the passage of the arms 83. The ramps or aprons 87 at their lower edges terminate in trough-shaped or channel-shaped portions 89 having vertical sides 90 and 91, to which angle brackets 92 are attached, as by welding. The lower ends of the angle brackets 92 are secured as at 93 to the frame upper cross members 14.

In order to control the forward oscillations of the blocks 70 which form portions of the weighing devices, individually and generally designated 94, transverse rods 95 are journaled at their opposite ends in brackets 96 secured, as at 97 (Figures 3 and 4) to the flanges of the channel members 48. Mounted on one end of each rod 95 is a crank arm 98 (Figure 5) carrying at its outer end a pivot pin 99 upon which the enlarged and bored collars 100 of a rod 101 is pivotally supported. The rods 95 are bored transversely, as at 102, to receive stop pins 103 which project upward obliquely into engagement with the front surfaces of the blocks 70.

Each of the weighing units or stations 42, 43 and 44 is provided with one of the collars 100 secured to the rod 101 at spaced intervals therealong, so that as the rod 101 is reciprocated, the rods 95 are rotated by the crank arms 98, thereby swinging the stop pins 103 into and out of proximity to the blocks 70. When the pins 103 are close to the blocks 70 (Figure 4), the weighing device 94 can tilt only a short distance which is, however, insufficient to drop the egg 38 out of the arcuate portions 84 on the egg supports 81. When, however, the shafts 95 are swung clockwise (Figure 4), the pins 103 are swung out of proximity to the blocks 70, permitting the weighing devices 94 which are overbalanced by sufficiently heavy eggs 38 to dump their eggs upon the ramps 87, and thence onto the surfaces of the endless conveyors 45, 46 or 47, as the case may be. The endless conveyors 45, 46 and 47 are supported at their opposite ends upon pulleys 104 (Figure 1), the forward pulleys only being shown. These forward pulleys 104 are journaled upon the upper ends of spaced arms 105 which, in turn, are interconnected by hubs 106 mounted upon a pivot rod 107. The hubs 106 (Figure 1) are provided with central arms 108 through which adjusting screws 109 are threaded, the inner ends engaging the lower cross members 13. The shaft 107 is journaled in bearing brackets 110 secured to the cross-member 13, the adjusting screws 109 permitting the tightening or loosening of the endless conveyors 45, 46 and 47.

In order to shift the rod 101, the left-hand end thereof is pivotally connected, as at 111 (Figure 1) to the upper arm of a bell-crank 112. Pivoted, as at 113, to the lower arm of the bell-crank 112, is a vertical rod 114 which passes downward and is shifted periodically by an additional cam also shown in my previously-mentioned co-pending application, Serial No. 718,755, filed December 27, 1946.

The operation of the machine 10 as a whole is described in detail in my above-mentioned co-pending application Serial No. 718,755. The reciprocation and rise and fall of the slide 25 and egg holders 37 in timed cycles causes rows of eggs to be successively picked up and deposited upon the egg supports 81 of the weighing stations 42, 43 and 44 from the egg rest 41 (Figure 1). If the eggs deposited at the first egg-weighing station 42 are heavy enough, they tilt the blocks 70 of the weighing devices 94 around their pivot pins or spindles 68 into contact with the contact pins 103 (Figure 4), overbalancing the counter-weights 77. After each reciprocation of the slide 25, the rod 101 is automatically shifted to permit the tilted egg weighing devices 94 to dump their sufficiently-heavy eggs, whereas, those which are carrying insufficiently-heavy eggs remain upright, and their eggs are removed upon the next reciprocation of the slide 25, and carried to the next egg-weighing station 43. Here the same weight-responsive selection takes place, and the sufficiently-heavy eggs are dumped onto the endless conveyor 46 and carried away, while the light eggs are transported upon the next reciprocation of the slide 25 to the weighing station 44. Here the light eggs are weighed out, dumped on the endless conveyor 47 and carried away. All remaining eggs are then carried to the final station 48 and dumped without weighing upon the endless conveyor 49 and carried away. All of the foregoing operation has been discussed in connection with my previously mentioned application Serial No. 718,755.

The present invention, however, by the additional provision of the rockable channel member 48 and the adjusting screws 57 and 58 (Figures 2 and 5) provides for bodily tilting the weighing devices 94 at each weighing station simultaneously so as to alter the weight of egg at which each weighing device 94 will dump. Thus, by a single adjustment, the entire bank of weighing devices 94 mounted on a given tiltable channel member 48 may be adjusted to dump heavier or lighter eggs. If the eggs are running abnormally heavy, the channel member 48 at the first weighing station 42 may be tilted so as to cause the individual weighing devices 94 to dump heavier eggs than previously, passing a greater proportion of eggs onward to the next weighing station 43. In this manner, the proportions of the eggs distributed between the various classes, such as heavy, medium and light, may be adjusted instantly without disturbing the individual adjustments of the counterweights 77 upon each weighing device 94. When the eggs start running light again, the proportions may be restored by readjusting the channel member 48 of the first weighing station 42 to tilt under the weight of lighter eggs, thereby transmitting a smaller proportion thereof to the succeeding weighing stations 43 and 44.

The egg-weighing devices 94 in a given bank or row are positively held up and then released simultaneously so that all the eggs being weighed out at that station will be dumped simultaneously upon the endless conveyor at that station. This prevents the heavier eggs from being dumped first and then being broken by a lighter egg coming down on top of them after they have been carried a certain distance by the conveyor beneath the weighing device carrying the lighter egg. The present invention completely prevents such breakage.

The modification shown in Figure 6 provides for quick removal of each bank of weighing devices 94. In this modification, the angle brackets 55 are split diametrically of their bores 54 so as to provide bearing caps 55a which are bolted as at 55b to the angle bracket 55. Thus, to remove the entire bank of weighing devices supported upon a given channel member 50, it is only necessary to unscrew the bolts 55b and remove the bearing caps 55a. Such removal is occasionally necessary in order to clean the various weighing devices after they have become fouled by dirt, feathers or broken eggs.

Experience with the egg-feeding unit 40 as disclosed in my co-pending application Serial No. 718,755 filed December 27, 1946, has proved that the spools thereof upon which the eggs are rotated while being fed tend to stick as a result of clogging by dirt or other foreign matter. To eliminate this difficulty, the modified egg-feeding unit 125 shown in Figures 7 to 9 inclusive has been provided. The egg-feeding unit 125 is mounted upon legs 126 which are interconnected by an angle member 127 (Figure 8). Supported by the angle member 127 is a cross member 128 which in turn supports horizontal stripping fingers 129 which strip the bottoms or flats from the fillers or egg-containers in which the eggs are received. The action of these stripping fingers 129 has been described in my co-pending application Serial No. 718,755 previously mentioned.

The egg-feeding unit 125 (Figures 7 and 8) includes a frame formed by a pair of vertical channel members 133 mounted on the upper ends of the legs 126 with their channel portions facing one another. The channel members 133 are interconnected at intervals by upper and lower angle members 134 and 135 which in turn support upper and lower diverging guide rails 136 and 137 respectively (Figure 9). The lower flanges of the channel members 133 are separated from the lower angle members 135 by spacing members 138.

Bolted to the channel members 133 at their forward and rearward ends are pairs of aligned bearing bushings 139 and 140 respectively, in which are journaled cross shafts 141 and 142 respectively. The shafts 141 and 142 carry sprockets 143 and 144 respectively, these being encircled by endless chains 145. The endless chains 145 at intervals are interconnected by rods 146 carrying capstan-shaped rollers or spools 147. The spools 147 are keyed or splined to the rods 146 as at 147a (Figure 9) so as to be positively driven by the rods 146 while being slidable axially therealong. The spools 147 near their opposite ends are provided with annular grooves 148 engageable with the guide rails 136 or 137.

A cross member 149 extends between the left-hand end of the channel members 133 (Figure 7) and serves to support egg rests 150 which are similar to the egg rests 41 previously described. The egg rests 150 consist of pairs of thin parallel bars 151 separated by gaps less than the small diameter of an undersized egg and having arcuate cutaway portions 152 on their upper edges. The right-hand ends of the bars 152 are positioned approximately in line with the grooves 148 of the spools 147. The channel members 133 at their left-hand ends rest upon an angle member 153 which in turn is secured to an angle member 154 mounted on the legs 12 at the right-hand end of the egg-sorting unit 10 (Figures 1 and 8).

In order to drive the sprocket chain 145, the shaft 142 carries an outer sprocket 155 upon the outer end thereof (Figure 7), this being driven by a sprocket chain (not shown) connected to the driving mechanism for the egg-sorting machine 10, in a manner fully disclosed in my previously-mentioned co-pending application Serial No. 718,755. In order to positively rotate the spools 147 upon their shafts 146, each of the latter is provided at one end with a pinion 156 (Figures 7 and 9) which meshes with the teeth 157 of an orbital or elongated endless rack 158 (Figure 8). The rack 158 is secured by bolts 159 and tubular spacers 160 to one of the channel members 133 (Figure 9) so as to be accurately held in position.

In the operation of the modified egg-feeding unit 125 shown in Figures 7 to 9 inclusive, let it be assumed that the cardboard fillers or egg-containers have been slid along the fingers 129 and that their bottoms have been removed by the latter. As the fillers are slid beyond the left-hand ends of the fingers 129, the eggs therein drop upon the spools 147 and come to rest between spools. Meanwhile, the rotation of the sprocket 155 and the consequent rotation of the sprockets 143 and 144 drives the sprocket chains 133 in an orbital path, carrying with them the rods 146. As these move along, the pinions 156 roll upon the teeth 157 of the orbital rack 158, causing the rods 146 and their spools 147 to be forcibly and positively rotated. In this manner, the spools 147 are prevented from sticking or binding, as occasionally occurs with freely rotatable spools. The eggs are thus forcibly rotated as they are advanced to the left, causing them to reach the egg rests 150 with their long axes approximately horizontal.

As the spools 147 and their rods 146 travel toward the left (Figure 7), the guide rails 136 engage the spool grooves 148 and cause the eggs to be separated into spaced rows, the eggs of each row finally coming to rest with their long axes horizontal in the arcuate cutaway portions 152 of the egg rests 150. The eggs are thus deposited in the positions similar to those shown for the eggs 38 upon the egg rests 41 in Figure 1, and the operation of the machine is thenceforth as described above.

In the operation of the machine, it occasionally happens that an egg is dislodged from the egg rests 41 or 150 (Figures 1 and 8) and drops downward. To prevent or minimize the breakage of such eggs, the angle member 154 is provided with holes 161 (Figure 1) beneath the egg rests 41 or 150, these holes being large enough for the passage of an egg. Thus, the egg drops through the holes 161 and falls upon a soft rubber pad 162 of sponge rubber or the like mounted upon an inclined chute 163 which directs them downward to a suitable receiver (not shown). Thus, the eggs which would otherwise be broken when dislodged from the egg rests 41 or 150 arrive undamaged in the receiver and may be removed from the latter and placed back in the machine for further sorting. The chute 163 is provided with an end wall 164 and side walls 165 to prevent the egg from bouncing out.

What I claim is:

1. An adjustable-range egg-sorting machine comprising a supporting structure, an elongated member tiltably mounted on said supporting structure, an adjusting element engaging said elongated member to limit the tilting thereof, a plurality of tiltable egg-weighing devices having counterweights thereon, said egg-weighing devices being mounted upon said member and responsive to predetermined weights of eggs to tilt said devices to dump the eggs therefrom, the tilting axes of said elongated member and egg-weighing devices being arranged substantially parallel to one another, the center of gravity of each counterweight being arranged a substantial distance above the horizontal plane through the tilting axis of its respective egg-weighing device, and a conveyor arranged adjacent said egg-weighing devices for carrying away the eggs so dumped.

2. An adjustable-range egg-sorting machine comprising a supporting structure, an elongated member tiltably mounted on said supporting structure, an adjusting element engaging said elongated member to limit the tilting thereof, a plurality of tiltable egg-weighing devices having counterweights thereon, said egg-weighing devices being mounted upon said member and responsive to predetermined weights of eggs to tilt said devices to dump the eggs therefrom, the tilting axes of said elongated member and egg-weighing devices being arranged substantially parallel to one another, the center of gravity of each counterweight being arranged a substantial distance above the horizontal plane through the tilting axis of its respective egg-weighing device, an individual tilt adjustment for each device, and a conveyor arranged adjacent said egg-weighing devices for carrying away the eggs so dumped.

3. An adjustable-range egg-sorting machine comprising a supporting structure, an elongated member tiltably mounted on said supporting structure, an adjusting element engaging said elongated member to limit the tilting thereof, a plurality of tiltable egg-weighing devices having counterweights thereon, said egg-weighing devices being mounted upon said member and responsive to predetermined weights of eggs to tilt said devices to dump the eggs therefrom, an individually adjustable counterweight on each device, the tilting axes of said elongated member and egg-weighing devices being arranged substantially parallel to one another, the center of gravity of each counterweight being arranged a substantial distance above the horizontal plane through the tilting axis of its respective egg-weighing device, and a conveyor arranged adjacent said egg-weighing devices for carrying away the eggs so dumped.

4. An adjustable-range egg-sorting machine comprising a supporting structure, an elongated member tiltably mounted on said supporting structure, an adjusting element engaging said elongated member to limit the tilting thereof, a plurality of tiltable egg-weighing devices having counterweights thereon, said egg-weighing devices being mounted upon said member and responsive to predetermined weights of eggs to tilt said devices to dump the eggs therefrom, the tilting axes of said elongated member and egg-weighing devices being arranged substantially parallel to one another, the center of gravity of each counterweight being arranged a substantial distance above the horizontal plane through the tilting axis of its respective egg-weighing device, and a conveyor arranged adjacent said egg-weighing devices for carrying away the eggs so dumped, the axes of tilt of said egg-weighing devices being substantially parallel.

5. An adjustable-range egg-sorting machine comprising a supporting structure, an elongated member tiltably mounted on said supporting structure, an adjusting element engaging said elongated member to limit the tilting thereof, a plurality of tiltable egg-weighing devices having counterweights thereon, said egg-weighing devices being mounted upon said member and responsive to predetermined weights of eggs to tilt said devices to dump the eggs therefrom, the tilting axes of said elongated member and egg-weighing devices being arranged substantially parallel to one another, the center of gravity of each counterweight being arranged a substantial distance above the horizontal plane through the tilting axis of its respective egg-weighing device, a shiftable stop disposed adjacent each weighing device and arranged in one position to prevent tilting thereof beyond a predetermined angle and in another position to permit such tilting, and a conveyor arranged adjacent said egg-weighing devices for carrying away the eggs so dumped.

6. An adjustable-range egg-sorting machine comprising a supporting structure, an elongated member tiltably mounted on said supporting structure, an adjusting element engaging said elongated member to limit the tilting thereof, a plurality of tiltable egg-weighing devices having counterweights thereon, said egg-weighing devices being mounted upon said member and responsive to predetermined weights of eggs to tilt said devices to dump the eggs therefrom, the tilting axes of said elongated member and egg-weighing devices being arranged substantially parallel to one another, the center of gravity of each counterweight being arranged a substantial distance above the horizontal plane through the tilting axis of its respective egg-weighing device, a shiftable stop disposed adjacent each weigh device and arranged in one position to prevent tilting thereof beyond a predetermined angle and in another position to permit such tilting, an adjustable stop disposed adjacent each weighing device in a position limiting the tilting thereof in the opposite direction from the limiting imposed by said shiftable stop and a conveyor arranged adjacent said egg-weighing devices for carrying away the eggs so dumped.

7. An adjustable-range egg-sorting machine comprising a supporting structure having laterally spaced cross-members, an elongated member tiltably mounted near its opposite ends on said cross-members, a limit element adjustably engaging said elongated member to limit the tilt thereof, an opposing element oppositely engaging said elongated member to limit tilting thereof in the opposite direction, a plurality of tiltable egg-weighing devices having counterweights thereon, said egg-weighing devices being mounted upon said elongated member and responsive to predetermined weights of eggs to tilt said devices to dump the eggs therefrom, the tilting axes of said elongated member and egg-weighing devices being arranged substantially parallel to one another, the center of gravity of each counterweight being arranged a substantial distance above the horizontal plane through the tilting axis of its respective egg-weighing device, and a conveyor arranged adjacent said egg-weighing devices for carrying away the eggs so dumped.

8. An adjustable-range egg-sorting machine comprising a supporting structure having laterally-spaced cross-members, an elongated member tiltably mounted near its opposite ends on said cross-members, a limit element adjustably engaging said elongated member to limit the tilt thereof, an opposing element oppositely engaging said elongated member to limit tilting thereof in the opposite direction, a plurality of tiltable egg-weighing devices having counterweights thereon, said egg-weighing devices being mounted upon said elongated member and responsive to predetermined weights of eggs to tilt said devices to dump the eggs therefrom, the tilting axes of said elongated member and egg-weighing devices being arranged substantially parallel to one another, the center of gravity of each counterweight being arranged a substantial distance above the horizontal plane through the tilting axis of its respective egg-weighing device, and a conveyor arranged adjacent said egg-weighing devices for carrying away the eggs so dumped, each of said egg-weighing devices comprising a pair of spaced brackets and a tiltable body pivotally mounted between said brackets and having an egg-support extending outwardly from the pivot axis of said body.

9. An adjustable-range egg-sorting machine comprising a supporting structure having laterally spaced cross-members, an elongated member tiltably mounted near its opposite ends on said cross members, a limit screw threadedly supported adjacent said elongated member and adjustably engaging said elongated member to limit the tilt thereof, an opposing element oppositely engaging said elongated member to limit tilting thereof in the opposite direction, a plurality of tiltable egg-weighing devices having counterweights thereon, said egg-weighing devices being mounted upon said elongated member and responsive to predetermined weights of eggs to tilt said devices to dump the eggs therefrom, the tilting axes of said elongated member and egg-weighing devices being arranged substantially parallel to one another, the center of gravity of each counterweight being arranged a substantial distance above the horizontal plane through the tilting axis of its respective egg-weighing device, and a conveyor arranged adjacent said egg-weighing devices for carrying away the eggs so dumped.

10. An adjustable-range egg-sorting machine comprising a supporting structure having laterally-spaced cross-members, an elongated member tiltably mounted near its opposite ends on said cross-members, a limit element adjustably engaging said elongated member to limit the tilt thereof, an opposing limit screw threadedly supported adjacent said elongated member and oppositely engaging said elongated member to limit tilting thereof in the opposite direction, a plurality of tiltable egg-weighing devices having counterweights thereon, said egg-weighing devices being mounted upon said elongated member and responsive to predetermined weights of eggs to tilt said devices to dump the eggs therefrom, the tilting axes of said elongated member and egg-weighing devices being arranged substantially parallel to one another, the center of gravity of each counterweight being arranged a substantial distance above the horizontal plane through the tilting axis of its respective egg-weighing device, and a conveyor arranged adjacent said egg-weighing devices for carrying away the eggs so dumped.

11. An adjustable-range egg-sorting machine comprising a supporting structure having laterally-spaced cross-members, an elongated member tiltably mounted near its opposite ends on said cross-members, a limit screw threadedly supported adjacent said elongated member and adjustably engaging said elongated member to limit the tilt thereof, an opposing limit screw threadedly supported adjacent said elongated member and oppositely engaging said elongated member to limit tilting thereof in the opposite direction, a plurality of tiltable egg-weighing devices having counterweights thereon, said egg-weighing devices being mounted upon said elongated member and responsive to predetermined weights of eggs to tilt said devices to dump the eggs therefrom, the tilting axes of said elongated member and egg-weighing devices being arranged substantially parallel to one another, the center of gravity of each counterweight being arranged a substantial distance above the horizontal plane through the tilting axis of its respective egg-weighing device, and a conveyor arranged adjacent said egg-weighing devices for carrying away the eggs so dumped.

12. An adjustable-range egg-sorting machine comprising a supporting structure, an elongated member tiltably mounted on said supporting structure, an adjusting element engaging said elongated member to limit the tilting thereof, a plurality of tiltable egg-weighing devices having counterweights thereon, said egg-weighing devices being mounted upon said member and responsive to predetermined weights of eggs to tilt said devices to dump the eggs therefrom, the tilting axes of said elongated member and egg-weighing devices being arranged substantially parallel to one another, the center of gravity of each counterweight being arranged a substantial distance above the horizontal plane through the tilting axis of its respective egg-weighing device, and a conveyor arranged adjacent said egg weighing devices for carrying away the eggs so dumped, said supporting structure having a removable bearing member tiltably supporting said elongated member whereby to facilitate rapid removal of said elongated member from said machine.

13. An adjustable-range egg-sorting machine comprising a supporting structure, an elongated member tiltably mounted on said supporting structure, an adjusting element engaging said elongated member to limit the tilting thereof, a plurality of tiltable egg-weighing devices having counterweights thereon, said egg-weighing devices being mounted upon said member and responsive to predetermined weights of eggs to tilt said devices to dump the eggs therefrom, the tilting axes of said elongated member and egg-weighing devices being arranged substantially parallel to one another, the center of gravity of each counterweight being arranged a substantial distance above the horizontal plane through the tilting axis of its respective egg-weighing device, and a conveyor arranged adjacent said egg weighing devices for carrying away the eggs so dumped, said elongated member having pivot elements thereon and said supporting structure having divided bearing members with removable portions tiltably supporting said pivot elements whereby to facilitate rapid removal of said elongated member from said machine.

CLARENCE PAGE.

REFERENCES CITED

The following references are of record in the file of this patent:

UNITED STATES PATENTS

| Number | Name | Date |
| --- | --- | --- |
| 1,884,999 | White | Oct. 25, 1932 |
| 2,187,842 | Rheinstrom | Jan. 23, 1940 |
| 2,296,645 | Marsden | Sept. 22, 1942 |
| 2,305,212 | White | Dec. 15, 1942 |
| 2,347,068 | Sneed | Apr. 18, 1944 |